United States Patent
Hierstetter et al.

(10) Patent No.: US 6,911,495 B2
(45) Date of Patent: Jun. 28, 2005

(54) PROCESS FOR THE CONTINUOUS PREPARATION OF TWO-COMPONENT ADDITION-CROSSLINKING SILICONE COMPOSITIONS

(75) Inventors: Thomas Hierstetter, Burghausen (DE); Johann Schuster, Emmerting (DE); Gerhard Skroch, Braunau (AT); Helmut Woehrl, Altoetting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/444,385

(22) Filed: May 23, 2003

(65) Prior Publication Data

US 2004/0006173 A1 Jan. 8, 2004

(30) Foreign Application Priority Data

Jun. 27, 2002 (DE) .......................................... 102 28 842

(51) Int. Cl.$^7$ ................................................ C08L 83/00
(52) U.S. Cl. ........................... 524/588; 528/32; 528/14; 528/31
(58) Field of Search ........................... 524/588; 528/32, 528/14, 31

(56) References Cited

U.S. PATENT DOCUMENTS

| | | | |
|---|---|---|---|
| 5,057,151 A | 10/1991 | Schuster et al. | |
| 6,218,495 B1 | 4/2001 | Braun et al. | |
| 6,313,217 B1 | 11/2001 | Barthel et al. | |

FOREIGN PATENT DOCUMENTS

| | | | |
|---|---|---|---|
| CA | 2 095 572 | * 11/1993 | |
| DE | 04 215 205 | 1/1994 | |
| DE | 4 242 833 | 6/1994 | |
| DE | 4 005 823 | 1/1997 | |
| DE | 198 09 548 | 9/1999 | |
| EP | 0 378 785 | 4/1993 | |
| EP | 0 568 890 | 11/1993 | |
| EP | 0 568 891 | 11/1993 | |
| EP | 0 807 505 | 11/1997 | |

OTHER PUBLICATIONS

English Derwent Abstract AN 1993—353028 [45] corresp. to EP 0 568 891.
English Derwent Abstract AN 1999–481056 [41] corresp. to DE 198 09 548.
English Derwent Abstract AN 1991–260784 [36] corresp. to DE 4 005 823.
English Derwent Abstract AN 1990–172169 [23] corresp. to EP 378 785.
English Derwent Abstract AN 1993–353028 [45] corresp. to EP 05 68 891 A1.
English Derwent Abstract AN 1993–353028 [45] corresp. to DE 04 215 205.
English derwent Abstract AN 1994–209481 [46] corresp. to DE 4 242 833.

* cited by examiner

Primary Examiner—Kuo-Liang Peng
(74) Attorney, Agent, or Firm—Brooks Kushman P.C.

(57) ABSTRACT

A process for the continuous preparation of addition-crosslinking silicone rubbers from a base composition containing at least one polyvinyl polysiloxane and at least 10% by weight, based on the liquid silicone rubber, of hydrophobicized filler, by removing the base composition from a container whose volume reduces proportionally with the amount removed, and conveying the composition by way of a pump with a positive pressure difference to two further pumps (4) which convey the base composition onward, so a component A is prepared continuously by admixing at least one metal catalyst with one stream of the base composition, and a component B is prepared continuously and simultaneously by admixing the crosslinker and inhibitor with a second stream of the base composition, where the metal catalyst, crosslinker, and inhibitor are fed by way of a feed unit which meters in each of the substances.

20 Claims, 1 Drawing Sheet

PROCESS FOR THE CONTINUOUS PREPARATION OF TWO-COMPONENT ADDITION-CROSSLINKING SILICONE COMPOSITIONS

BACKGROUND OF THE INVENTION

1. Field of the Invention

The invention relates to a process for the continuous preparation of addition-crosslinking liquid silicone rubbers.

2. Background Art

EP 0 568 891 A1 (DE 4 215 205) describes a process for the continuous preparation of liquid silicone rubbers. The object was to provide a process for the complete continuous compounding of crosslinkable silicone rubbers, in particular for the parallel preparation of two components of liquid silicone rubbers, the stated polymers also being relevant to the HTV product sector. The publication claims a multistage process with a hydrophobicizing reaction in the first three stages (e.g. using HMN), followed by division of the material into an A stream and B stream, with admixture of small amounts of the necessary additives by way of (coolable) static mixers.

There are operational difficulties with the foregoing process, due to difficulty of dealing with safety aspects, such as the removal of oxygen from the silica feed, which may pose an explosion risk, the conduct of the reaction with return of the treatment agent, and also the degassing and temperature control which is important for admixture of temperature-sensitive additives in the A/B streams. The result is a very long residence time, and therefore dead time within which the process cannot be controlled. The efficiency of incorporation of additives into the A component and B component by way of coolable static mixers is variable, in respect of both temperature reduction and especially mixing quality. The use of static mixers to introduce very small amounts which decisively affect the material is a process which either becomes very complicated or is unreliable.

DE 198 09 548 A1 describes a process for the continuous preparation of moisture-crosslinkable organopolysiloxane compositions. An object was to provide a process for the continuous preparation of RTV-1 compositions while minimizing the losses of time and RTV-1 composition resulting from a mixing specification change (e.g. color). That publication claims a three-stage process in which a crude mixture is first prepared from α,ω-dihydroxypolydiorganosiloxanes and a hydrophilic filler, and after degassing, this mixture is treated with additives, such as crosslinkers and condensation catalysts, by means of a dynamic mixer. Because this mixer has small volume, its cleaning produces only a small loss of time and material on product change. The RTV-1 compositions contain relatively few starting materials, weight variations of which have a less severe effect than is the case with addition-crosslinking systems. Emphasis is placed on minimization of losses, specifically on product change.

SUMMARY OF THE INVENTION

An object of the invention is to overcome the disadvantages of the prior art in the continuous preparation of addition-crosslinking, two-component silicone compositions. These and other objects are achieved by the use of a continuous process in which a base composition comprising at least one vinyl-functional polysiloxane containing hydrophobic filler is pumped from a container whose volume reduces proportionately with the amount of base composition removed and is divided into two streams which are mixed with their respective additional components, preferably by use of dynamic mixers.

DETAILED DESCRIPTION OF THE PREFERRED EMBODIMENTS

Figure 1:
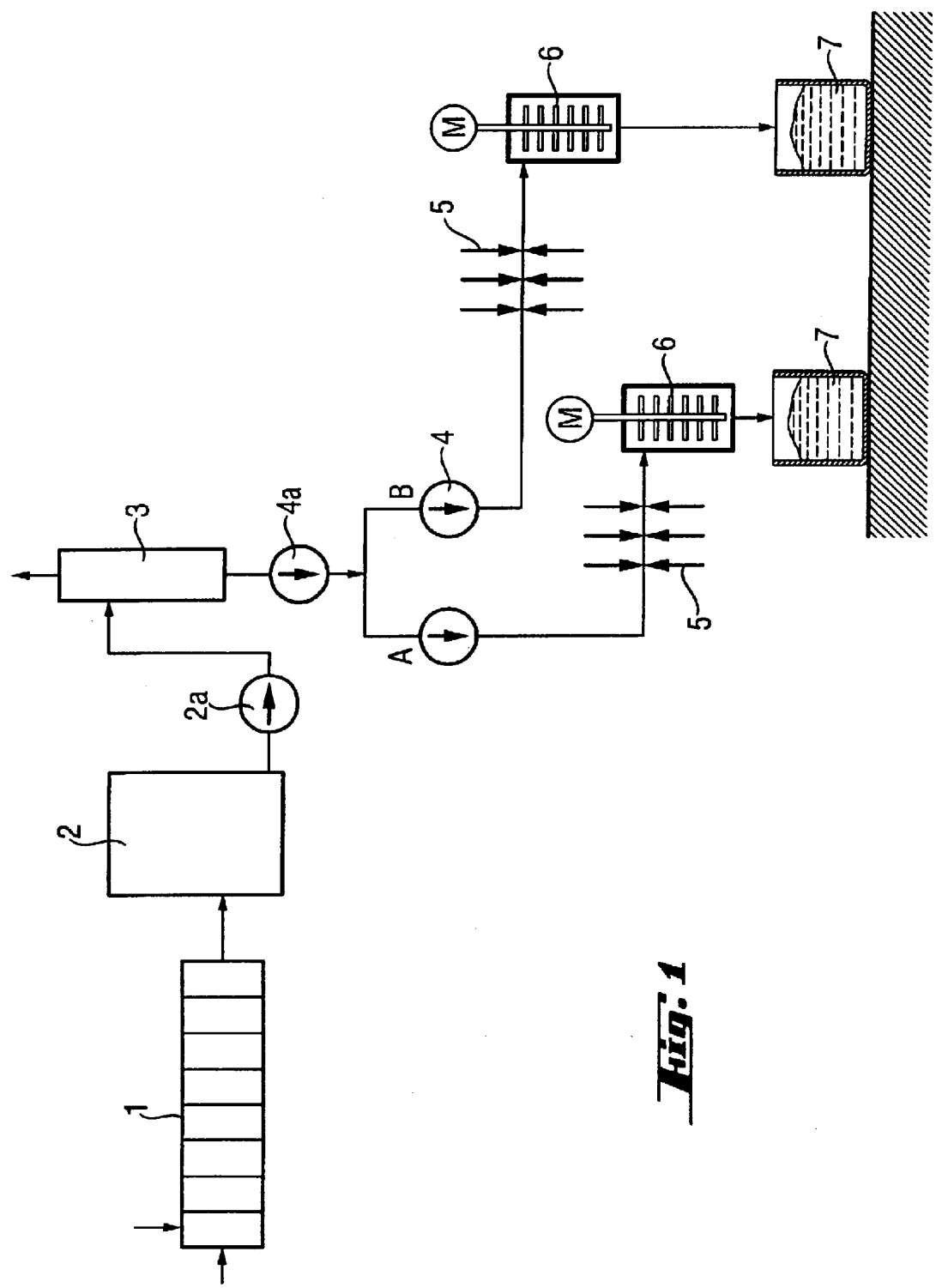
FIG. 1 illustrates schematically one embodiment of the subject invention continuous preparation process.

The invention thus provides a process for the continuous preparation of addition-crosslinking silicone rubbers based on at least one polyvinyl polysiloxane with at least 10% by weight, based on the liquid silicone rubber, of hydrophobicized filler, which comprises removing a base composition made from polyvinyl polysiloxane and filler from a container (2) whose volume reduces proportionally with the amount removed, and conveying the composition by way of a pump (4a) with a positive pressure difference to two further pumps (4) which convey this base composition onward, so that a component A is prepared continuously by admixing at least one metal catalyst with the base composition, and a component B is prepared continuously and simultaneously by admixing the crosslinker and inhibitor with the base composition made from polyvinyl polysiloxane and filler, where the metal catalyst, crosslinker, and inhibitor are fed by way of a feed unit which meters in the appropriate amount of each of the substances.

The base composition is preferably prepared by following the process of EP 807 505 for preparing organopolysiloxane compositions by mixing and kneading (1) organopolysiloxanes which have an average of at least two silicon-bonded radicals per molecule, selected from
  (a) hydrocarbon radicals having aliphatic carbon-carbon multiple bonds,
  (b) hydrogen atoms, and
  (c) hydroxy groups, and
(2) pre-hydrophobicized oxidic reinforcing fillers with a carbon content of at least 0.5% by weight obtained by way of the hydrophobicization, the mixing taking place in a kneading machine with at least two kneading chambers arranged in series alongside one another, each of said kneading chambers comprising two kneading elements parallel to the axis of the chamber, capable of being driven so as to corotate or to counterrotate, the connection between the chambers being by way of apertures through which material can pass perpendicularly to the axes of the kneading elements, where the first kneading chamber has a feed aperture and the final kneading chamber has a discharge aperture.

The organopolysiloxanes (1) used preferably comprise linear or branched organopolysiloxanes composed of units of the general formula I $$R^1_a R^2_b SiO_{\frac{4-a-b}{2}},\qquad\text{(I)}$$

where $R^1$ are monovalent $C_1$–$C_{10}$-hydrocarbon radicals, optionally substituted by halogen atoms, the radicals being free from aliphatic carbon-carbon multiple bonds, $R^2$ are hydrogen atoms, hydroxy groups, or monovalent hydrocarbon radicals having an aliphatic carbon-carbon multiple bond and having from 2 to 8 carbon atoms per radical, a is 0, 1, 2, or 3, and b is 0, 1, or 2, with the proviso that the average number of radicals $R^2$ present per molecule is at least 2.

The organopolysiloxanes (1) preferably have an average viscosity of at least 10 mPa·s, in particular at least 1,000 mPa·s, and preferably not more than $10^8$ mPa·s, in particular not more than $10^5$ mPa·s, at 25° C.

Examples of unsubstituted hydrocarbon radicals $R^1$ are $C_1-C_{10}$-alkyl, $C_1-C_{10}$-alkaryl, or $C_1-C_{10}$-aralkyl radicals whose alkyl moiety is saturated, or $C_6-C_{10}$-aryl radicals. Examples of alkyl radicals $R^1$ are the methyl, ethyl, n-propyl, isopropyl, n-butyl, isobutyl, tert-butyl, n-pentyl, isopentyl, neopentyl, tert-pentyl radical; hexyl radicals such as the n-hexyl and cyclohexyl radical; heptyl radicals such as the n-heptyl radical; octyl radicals such as the n-octyl radical, and isooctyl radicals, such as the 2,2,4-trimethylpentyl radical; nonyl radicals such as the n-nonyl radical; decyl radicals such as the n-decyl radical; and cycloalkyl radicals such as the cyclohexyl radical. Examples of alkaryl radicals $R^1$ are the α- and β-phenylethyl radicals. Examples of aralkyl radicals $R^1$ are the benzyl radical and the 2,4-diethylbenzyl radical. Examples of aryl radicals $R^1$ are the phenyl radical and the naphthyl radical. $R^1$ are preferably $C_1-C_6$-alkyl radicals and phenyl radicals, in particular methyl and ethyl radicals.

Examples of hydrocarbon radicals $R^1$ substituted by halogen atoms are the 3,3,3-trifluoro-n-propyl radical, the 2,2,2,2',2',2'-hexafluoroisopropyl radical, the heptafluoroisopropyl radical, the 3-chloro-n-propyl radical, the 2-bromoethyl radical, and the 3-bromopropyl radical. The radicals $R^1$ preferably have no substitution.

Examples of monovalent hydrocarbon radicals having an aliphatic carbon-carbon multiple bond having from 2 to 8 carbon atoms per radical $R^2$ are alkenyl radicals such as the vinyl, 5-hexenyl, 1-propenyl, allyl, 1-butenyl, and 1-pentenyl radical; and alkynyl radicals such as the ethynyl, propargyl, and 1-propynyl radical. The terms "polyvinyl" or "vinyl-functional" refer to all these and other radicals containing carbon-carbon multiple bonds which can be hydrosilylated.

The organopolysiloxanes (1) preferably have at least 90 mol %, in particular at least 95 mol %, of units of the general formula I where a+b=2. The organopolysiloxanes (1) preferably have at least 60 mol %, more preferably at least 80 mol %, and most preferably at least 95 mol %, of units of the general formula I where b is 0.

For every 100 parts by weight of the organopolysiloxanes (1) it is preferable to use at least 5 parts by weight, more preferably at least 10 parts by weight, most preferably at least 20 parts by weight, and not more than 200 parts by weight, preferably not more than 150 parts by weight, and most preferably not more than 100 parts by weight, of pre-hydrophobicized oxidic reinforcing fillers (2).

Each of the fillers (2) is preferably a pre-hydrophobicized pulverulent filler, such as fumed silica, precipitated silica, and silicon-aluminum mixed oxides, or fibrous fillers, such as asbestos. A single type of filler may be used, as may also a mixture of at least two fillers. The carbon content obtained by hydrophobicization of the fillers (2) is preferably at least 1% by weight and preferably not more than 6% by weight. When the carbon content of the fillers (2) is determined, drying for at least 2 hours at at least 200° C. ensures that the carbon content measured is based on the hydrophobicizing layer of the fillers (2).

Particularly preferred reinforcing fillers (2) are fumed silica and precipitated silica. The BET surface area of the fillers (2) is preferably at least 50 m²/g, more preferably at least 100 m²/g, and most preferably at least 150 m²/g.

The fillers (2) may be hydrophobicized by treatment with, for example, organosilanes, -silazanes, or -siloxanes, or by way of etherification of hydroxy groups to give alkoxy groups. U.S. Pat. No. 5,057,151 describes a preferred hydrophobicization process.

The organopolysiloxanes (1a) which have hydrocarbon radicals having aliphatic carbon-carbon multiple bonds preferably have an average of from 2 to 10, in particular from 2 to 4, aliphatic carbon-carbon multiple bonds per molecule. The terminal units of the general formula I preferably have aliphatic carbon-carbon multiple bonds. The aliphatic carbon-carbon multiple bonds are preferably double bonds. The organopolysiloxanes (1a) preferably have an average viscosity of at least 100 mPa·s, more preferably at least 1,000 mPa·s, and preferably not more than $10^5$ mPa·s, more preferably not more than $5 \times 10^4$ mPa·s, at 25° C.

The organopolysiloxanes (1b) having Si-bonded hydrogen atoms preferably have an average of from 2 to 50, more preferably from 5 to 20, Si-bonded hydrogen atoms per molecule. The organopolysiloxanes (1b) preferably have an average viscosity of at least 10 mPa·s, more preferably at least 30 mPa·s, and preferably not more than $10^6$ mPa·s, most preferably not more than 10,000 mPa·s, at 25° C.

The organopolysiloxanes (1c) which have Si-bonded hydroxy groups preferably have from 2 to 4 hydroxy groups per molecule. They preferably have terminal hydroxy groups. The organopolysiloxanes (1c) preferably have an average viscosity of at least 10 mPa·s, more preferably at least 1,000 mPa·s, and preferably not more than $10^8$ mPa·s, more preferably not more than $5 \times 10^6$ mPa·s, at 25° C.

The average residence time of the composition in the kneading machine is preferably not more than one hour, more preferably not more than 30 min. When use is made of a kneading machine with 100 l capacity in the inventive process, 200 kg/h of organopolysiloxane composition can be prepared without difficulty with an average residence time of from 15 to 20 min, giving about 4,000 kg/d. The comparable amount of storage-stable organopolysiloxane compositions obtained by operation in a tilting kneader of 4,000 l capacity with an average residence time of 20 h is 3,000 kg. In the case of the tilting kneader, further time has to be added to this for emptying and, where appropriate, cleaning.

The organopolysiloxane compositions which comprise pre-hydrophobicized oxidic reinforcing fillers (2) have particularly good storage stability if only a portion of the organopolysiloxanes (1) is mixed in a first step with the fillers (2), and in a second step the mixture is kneaded at a temperature which is preferably not more than 130° C., until the viscosity of the mixture has reached a constant value, and in a third step the mixture is mixed with the remainder of the organopolysiloxanes (1). From 30 to 80% by weight of the organopolysiloxanes (1) are preferably used in the first step.

The process variant comprising three steps can be carried out in a kneading machine which has at least three kneading chambers, where the kneading chambers used for the third step have at least one additional feed aperture. In this third step, the remainder of the organopolysiloxanes (1) is preferably added in at least two, in particular at least three, kneading chambers, a smaller amount of organopolysiloxanes (1) preferably being added in the first kneading chamber of the third step than in the remaining kneading chambers. A particularly homogeneous organopolysiloxane composition is obtained when the organopolysiloxanes (1) are added to a plurality of kneading chambers in the third step.

The kneading machine used according to the invention permits control of the intensity of the kneading process and of the residence time, because the rotation rate and the direction of rotation of the kneading elements in each of the kneading chambers can be adjusted independently from one another, as desired. In the case of the pilot plant, for example, the rotation rates may be from 1 to 400 rpm. Even higher rotation rates are also possible if the mixing and kneading elements are suitably selected.

In the process variant comprising three steps, the kneading elements of the kneading chambers in the first and second steps may be operated with lower rotation rates than those in the third step. For example, the rotation rates in the third step are from two to five times as high as in the first and second step. If more than one kneading chamber is used for the first step, it is preferable for the kneading elements in one of the kneading chambers to counterrotate. This improves the fill level in the kneading machine and thus the residence time.

Since no free gas space is present in the kneading machine, there is no need for any gas blanket.

Product discharge from the kneading machine is easy, because the finished compositions can readily be conveyed to the discharge aperture by the kneading elements. The final kneading chamber preferably has pump vanes for product discharge.

The kneading machine preferably has at least three, in particular at least five, kneading chambers. Between individual kneading chambers, or between all of the kneading chambers, there may be screens, baffles, or slide valves to exert back-pressure on the organopolysiloxane compositions. These elements may be adjustable with respect to their position and the free passage aperture which they can provide. This method can be used to influence the residence time in the individual chambers. The kneading elements are preferably kneading blades, rollers, or polygonal disks.

Besides the feed aperture in the first kneading chamber, the kneading machine preferably has other feed apertures which lead into the individual kneading chambers or have been arranged between two kneading chambers. Each kneading chamber preferably has a feed aperture. In particular, the feed aperture in the first kneading chamber is suitable for solid feed, the other feed apertures being provided for the metering-in of liquids. Each kneading chamber preferably has a separately controllable drive, each drive preferably having a means of measuring torque. The torque is a measure of the viscosity of the mixture in the chamber.

The kneading chambers are preferably heatable or coolable, each having, in particular, the capability to operate at a different temperature. The kneading produces frictional heat, some of which is preferably dissipated by cooling, in order to avoid overheating of the composition. The kneading temperature is preferably not more than 200° C., in particular during the second step of the process variant comprising three steps.

The kneading elements preferably have bearings at only one end. The outer wall of the casing on the side with the bearing then has apertures for the drive shafts for the kneading elements. The casing of the kneading chambers can preferably separate along a line perpendicular to the axes of the elements, so that that portion of the casing distant from the bearing system can be moved away from the line of separation and away from the kneading elements, in the axial direction of the drive shafts. A kneading machine designed in this way is particularly easy to clean. DE-C-40 05 823 describes this type of kneading machine.

Preferred polyvinylsiloxanes of the invention are linear or branched polyvinylsiloxanes, and have an average of from 2 to 20, in particular from 2 to 4, aliphatic carbon-carbon multiple bonds per molecule. Substituents on the polyvinylsiloxane may be not only alkyl radicals having from 1 to 8 carbon atoms but also aryl radicals and/or fluoroalkyl radicals. The aliphatic carbon-carbon multiple bonds are preferably double bonds. The average viscosity is preferably at least 100 mPa·s, more preferably 1,000 mPa·s, and preferably not more than 10,000,000 mPa·s, more preferably not more than 500,000 mPa·s.

Preferred fillers are reinforcing fillers such as fumed silica and precipitated silica. Particular preference is given to reinforcing fillers which have been prepared with pre-hydrophobicization by methods such as those disclosed in EP 0 378 785 B1, e.g. with organosilanes, and which preferably have a BET surface area of at least 50 $m^2/g$, more preferably at least 100 $m^2/g$, and most preferably at least 150 $m^2/g$. The amount of the filler may be from 10 to 60% of the entire mixture, preferably from 15 to 45%, and more preferably from 20 to 40%.

The pre-hydrophobicization process of EP-0 378 785 B1 is preferably carried out in a mixer at rotation rates which are preferably from 300 to 2,000 rpm, in particular from 300 to 1 500 rpm, while at the same time carrying out mechanical work on the reaction mixture. Examples of mixers are Turrax, dissolvers, Henschel mixers and turbomixers. The process is preferably carried out in an inert atmosphere, the oxygen content having been reduced at least to 3% by volume. It is preferable to operate in an atmosphere of nitrogen or argon.

Once hydrophobicization is complete, the excess hydrophobicizing agent is removed, and is preferably reused in the next batch. Hydrophobicizing agent which has been removed by reaction is replaced, as are losses. The degree of hydrophobicization of the resultant hydrophobic, particulate solid can readily be varied by varying the rotation rate of the mixer. Preferred residence times are from 10 to 1,800 seconds. The process may be carried out either continuously or batchwise.

Based on the total weight of the reaction mixture, use is made of from 5 to 50% by weight, preferably from 20 to 30% by weight, of particulate solid which contains Si—OH groups and is composed of particulate solid and hydrophobicizing agent. However, the quantitative proportions in the process of the invention are always such that the reaction mixture composed of particulate solid and hydrophobicizing agent has a consistency of a paste. This paste consistency makes it possible for the reaction mixture to be subjected to high shear forces, even when the rotation rate of the mixer is low. The reaction mixture is subjected to a high level of mechanical work through these high shear forces, the result being that agglomerates of the particulate solid are comminuted, in turn increasing the level of hydrophobicization.

The particulate solid containing Si—OH groups preferably has a BET surface area of from 5 to 600 $m^2/g$, more preferably from 150 to 300 $m^2/g$. Examples of particulate solids are powdered quartz, diatomaceous earth, and clay minerals. It is preferable to use fumed or precipitated silicon dioxide.

For the purposes of the invention, the hydrophobicizing agents based on organosilicon compounds may be the same as those used previously for the hydrophobicization of particulate solid containing Si—OH groups. These hydrophobicizing agents comprise from 1 to 5% by weight of water, based on the total weight of the hydrophobicizing agent.

Together with water it is possible, if desired, to use metal compounds, e.g. titanium tetrachloride or dibutyltin dilaurate, and/or catalysts such as hydrogen chloride or amines, e.g. n-butylamine, these compounds promoting the reaction of fine-particle solid containing Si—OH groups with organosilicon compounds.

Preferred organosilicon compounds for hydrophobicizing agents have the general formula

where R are identical or different, monovalent, where appropriate substituted hydrocarbon radicals, Z is halogen, hydrogen, or a radical of the formula —OH, —OR', —NR'X, —ONR'$_2$, —OOCR', —O—, or —N(X)—, where R' is mostly an alkyl radical having from 1 to 4 carbon atoms and X is hydrogen or is as defined for R', and a is 1 or 2. The most important example by far of a hydrocarbon radical R is the methyl radical. Other examples of hydrocarbon radicals R are octadecyl radicals, the phenyl radical, and the vinyl radical. Particular examples of substituted hydrocarbon radicals R are halogenated hydrocarbon radicals, such as the 3,3,3-trifluoropropyl radical. Examples of radicals R' are the methyl, ethyl, and propyl radical.

Examples of organosilicon compounds of the formula given above are hexamethyldisilazane, trimethylsilanol, trimethylchlorosilane, trimethylethoxysilane, triorganosilyloxy acylates such as vinyldimethylacetoxysilane, triorganosilylamines, such as trimethylsilylisopropylamine, trimethylsilylethylamine, dimethylphenylsilylpropylamine, and vinyldimethylsilylbutylamine, triorganosilylaminooxy compounds, such as diethylaminooxytrimethylsilane and diethylaminooxydimethylphenylsilane, and also hexamethyldisiloxane, 1,3-divinyltetramethyldisiloxane, 1,3-diphenyltetramethyldisiloxane, and 1,3-diphenyltetramethyldisilazane.

Other examples of organosilicon compounds are dimethyldichlorosilane, dimethyldiethoxysilane, dimethyldimethoxysilane, diphenyldiethoxysilane, vinylmethyldimethoxysilane, methyltriethoxysilane, octamethylcyclotetrasiloxane, and/or dimethylpolysiloxanes having from 2 to 12 siloxane units per molecule and containing an Si-bonded hydroxy group in each terminal unit. It is also possible to react mixtures of various organosilicon compounds with the particulate solid containing Si—OH groups.

Particularly good results are achieved when using hydrophobicizing agents which are composed of from 70 to 89% by weight of hexamethyldisiloxane and/or trimethylsilanol, from 10 to 30% by weight of hexamethyldisilazane and/or divinyltetramethyldisilazane, and from 1 to 5% by weight of water. The % by weight data here are based on the total weight of the hydrophobicizing agent.

Most of the mixers mentioned do not have either heating equipment or equipment for generating pressure other than that of the surrounding atmosphere. The hydrophobicization is therefore preferably carried out without additional heating and at the pressure of the surrounding atmosphere, i.e. 1,080 hPa (abs.), or at about 1,080 hPa (abs.). However, if possible and desirable, use may also be made of other temperatures up to the boiling point of the hydrophobicizing agent, and/or of other pressures, preferably in the range from 1,000 to 10,000 hPa (abs.) during the hydrophobicization process.

The hydrophobic, particulate solid obtained by way of the process precipitates with high bulk density without any additional compaction step, and this is advantageous for further processing. The bulk density is higher than that of the starting material due to the destruction of voluminous agglomerates.

Inhibitors are known per se. Examples of these are acetylenically unsaturated alcohols, such as 3-methyl-1-butyn-3-ol, 1-ethynylcyclohexan-1-ol, 3,5-dimethyl-1-hexyn-3-ol, and 3-methyl-1-pentyn-3-ol. Examples of vinylsiloxane-based inhibitors are 1,1,3,3-tetramethyl-1,3-divinylsiloxane and poly-, oligo-, and disiloxanes containing vinyl groups.

Transition metal catalysts preferably used are platinum metals and/or compounds of these, preferably platinum and/or its compounds. Examples of these catalysts are finely divided metallic platinum, which may be present on supports, such as silicon dioxide, aluminum oxide, or activated carbon, compounds or complexes of platinum, such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, in particular platinum-divinyltetramethyldisiloxane complexes with or without detectable inorganically-bonded-halogen content, bis(gamma-picoline)platinum dichloride, and also reaction products of platinum tetrachloride with olefin and primary amine, or with secondary amine, or with primary amine and secondary amine, for example the reaction product of a 1-octene solution of platinum tetrachloride with sec-butylamine, or ammonium-platinum complexes, platinum catalysts for one-component systems, for example microencapsulated platinum complexes, or platinum-acetylide complexes, for example.

The amounts of the transition metal catalyst used are preferably from 0.5 to 500 ppm by weight (parts by weight per million parts by weight), in particular from 2 to 400 ppm by weight, in each case calculated as elemental transition metal and based on the total weight of the A and B components.

Crosslinkers used include organopolysiloxanes having Si-bonded hydrogen atoms, preferably with an average of from 2 to 200, particularly preferably from 5 to 70, Si-bonded hydrogen atoms per molecule. These crosslinkers have an average viscosity of 10 mPa·s, in particular at least 30 mPa·s, and preferably not more than 10,000 mPa·s, in particular not more than 1,000 mPa·s, at 25° C.

Starting from the existing continuous-production plant (1) in FIG. 1 for base compositions, producing base compositions in which pre-hydrophobicized silica and vinylorganopolysiloxanes are present, the stream of material is first conducted by way of a container (2) whose volume reduces proportionally to the amount removed, and which serves as a buffer, and whose storage capacity permits a fall in temperature. The structure of the container is preferably such that it is composed of a Kevlar fabric coated with a silicone. The container has preferably been designed as a folding container as in DE 4 242 833, its four corners running within a guide rail, with the use of rollers, thus allowing the container to fold up very cleanly when material is removed. The filling of this container preferably takes place from the center of the base. It is emptied laterally by way of a pump 2a, preferably a scaled gear pump which cannot suck in any replacement air, the result being that the pressure within the container can be reduced below atmospheric pressure such that the container can be emptied by the ambient pressure acting upon it. At the same time, this container serves as a buffer to ensure consistent feed to the system. The product stream is then conducted through a degassing system (3), which uses vacuum to remove gas inclusions. Other suitable coolers may be incorporated, if required, at any desired locations between the numbered items.

Prior to the division of the material stream into an A stream and B stream, the pressure is increased by means of the pump 4a upstream of the controllable metering pumps 4 allocated to the respective material streams. These feed the material, in the respective defined stream, at a temperature of from 20 to 200° C., preferably from 20 to 100° C., to the appropriate coolable dynamic mixers 6. The volume flow is also measured at the feed pumps (4), in order to ensure the correct ratio for metering-in of the additives. As an alternative to the feed pumps (4), it would also be possible to use metering cylinders, but these do not permit constant flow. The additives needed for the final compounding process, such as inhibitors, crosslinkers (Si—H-containing), catalyst (e.g. Pt-containing), vinylorganopolysiloxanes, or other additives, are admixed or added at the feed points 5, at the inlet to the dynamic mixers, which preferably have a cross-blade system with planetary movement. Where appropriate, it is also possible here for two or more dynamic mixers to have been arranged in series, so that the feeds can take place in a chemically rational sequence. All of the substances are incorporated in liquid to paste form.

Very small amounts are introduced continuously with very narrow tolerances, using extremely sophisticated weighing technology and feed technology, preferably weighing the additives via differential metering balances (volumetric feed also being possible). These balances control precision conveying pumps which preferably operate with ±5% by weight precision, based on the respective component weight to be fed, during a period of 3 min, and where the same applies over a longer period of 1 h, preferably with ±2% by weight precision, based on the respective component weight to be fed, during a period of 2 min, and where the same applies over a longer period of 1 h, most preferably with ±1% by weight precision, based on the respective component weight to be fed, during a period of 1 min, and where the same applies over a longer period of 1 h. The precision conveying pumps are preferably gear pumps, but piston pumps are also used.

Pigment paste may also be mixed into the material.

The dynamic mixers permit homogeneous, streak-free preparation of the A component and B component with little loss of pressure and with little heating of the material, this being significant for the catalyst, for example. In addition, these assemblies can process material streams with a viscosity of from 100 to 10 million mPa·s (D=0.89 s$^{-1}$).

The viscosity of the A component and B component can be controlled to target via on-line viscometers, giving process control. The dynamic mixers, preferably cooled, may cool the material stream from about 80° C. to 50° C.

After discharge from the dynamic mixers, the final compounded A and B components are drawn off into the intended packs (7).

EXAMPLES

Examples are given below of the preparation of liquid silicone rubbers by the novel process of the invention and, by way of comparison, by the previous semicontinuous process.

Preparation of a Liquid Silicone Rubber by the Process of the Invention

The system (1) produces 300 kg/h (higher throughputs being possible if required) of a base composition composed of vinylpolysiloxanes (divinylpolydimethylsiloxane with a viscosity of about 20,000 mPa·s) and of treated silica (hydrophobicized silica with a BET surface area of about 300 m$^2$/g, WACKER HDK SKS 300).

The degassing system (3) frees the cooled stream of underlying composition from gas inclusions in vacuo (about 100 mbar).

The pumps (4) divide the stream of underlying composition into 150 kg/h of A substream and 150 kg/h of B substream for production of the corresponding A component and B component.

The following materials are metered into the A stream at the mixer (6) (feed points 5) and homogenized:

14 kg/h of divinylpolydimethylsiloxane diluent polymer with a viscosity of about 20,000 mPa·s 240 g/h of Pt catalyst (Pt complex having alkenylsiloxane ligands)

110 g/h of 1-ethynylcyclohexan-1-ol inhibitor at a downstream mixer

The following materials are metered into the B stream at mixer (6) (feed points 5) and homogenized:

7 kg/h of divinylpolydimethylsiloxane diluent polymer with a viscosity of about 20,000 mPa·s 7 kg/h of organohydropolysiloxane (Si—H crosslinker with about 0.45% by weight H content)

130 g/h of 1-ethynylcyclohexan-1-ol inhibitor

Comparative Example

Preparation of a Liquid Silicone Rubber by the Previous Process

Equal parts of 300 kg of base composition (1) are introduced into an A tank and into a B tank.

The following materials are added to the A component by means of a batch mixer:

14 kg of divinylpolydimethylsiloxane diluent polymer with a viscosity of about 20,000 mPa·s 240 g of Pt catalyst (Pt complex having alkenylsiloxane ligands)

110 g of 1-ethynylcyclohexan-1-ol inhibitor

All of the substances were added in succession and carefully incorporated into the mixture.

The following materials are added to the B component by means of a batch mixer:

7 kg of divinylpolydimethylsiloxane diluent polymer with a viscosity of about 20,000 mPa·s 7 kg of organohydropolysiloxane (Si—H crosslinker with about 0.45% by weight H content and 24 Si-bonded hydrogen atoms per molecule)

130 g of 1-ethynylcyclohexan-1-ol inhibitor

All of the substances were added in succession and carefully incorporated into the mixture.

The A component and B component from the process of the invention are mixed in a ratio of 1:1 and vulcanized at 170° C. for 5 min. The same procedure is carried out with the A component and B component from the comparative example.

The table below shows the values for each of the rubbers/components:

|  | Process of the invention | | Previous process | |
| --- | --- | --- | --- | --- |
|  | Component A | Component B | Component A | Component B |
| Viscosity [mPa · s] (D = 0.89 s⁻¹) | 950,000 | 860,000 | 930,000 | 890,000 |
|  | Vulcanizate | | Vulcanizate | |
| Initiation temp. [° C.] | 120 | | 120 | |
| T90 value [s] | 190 | | 192 | |
| Hardness [Shore A] | 50 | | 50 | |
| Ultimate tensile strength [N/mm²] | 11 | | 11 | |
| Ultimate tensile strain [%] | 565 | | 554 | |

The table shows that the two processes are identical in terms of the homogeneity of the mixing procedure. Homogeneity was also clearly demonstrated by taking a large number of spot samples from the product stream. The values measured from these spot samples are all within the measurement scatter range.

Tests on an injection molding machine also showed no variations of any kind.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the continuous preparation of addition-crosslinking silicone rubber derived from a base composition comprising at least one polyvinyl polysiloxane with at least 10% by weight, based on the weight of the liquid silicone rubber, of hydrophobicized filler, comprising:

removing the base composition from a container whose volume reduces proportionally with the amount of base composition removed, and conveying the composition by way of a pump with a positive pressure difference to two further pumps which divide the base composition into two streams and convey the streams of base composition onward, continuously preparing a component A by admixing at least one metal catalyst with a first stream of base composition, and continuously and simultaneously preparing a component B by admixing a crosslinker and inhibitor to die second stream of base composition, where die metal catalyst, crosslinker, and inhibitor are fed into the respective streams by way of a feed unit which meters in each of the substances.

2. The process of claim 1, wherein die additives are mixed into a stream of base composition by means of a dynamic mixer.

3. The process claim 2, wherein said dynamic mixer is a crossblade system with planetary motion.

4. The process of claim 1, which is carried out at pressures of from 3 to 200 bar.

5. The process of claim 1, wherein die metering-in at the feed unit takes place by way of valves.

6. The process of claim 1, wherein the metering-in takes place with a tolerance of ±5% by weight, based on the respective component weight to be fed, during a period of 3 mm.

7. The process of claim 1, wherein the hydrophobicized filler used comprises pre-hydrophobicized filler.

8. The process of claim 1, wherein the metering-in of the substances at the feed unit is gravimetric.

9. The process of claim 1, wherein the interior of said container is maintained at a pressure below the external ambient pressure.

10. The process of claim 9, wherein said base composition is delivered to a first pump under pressure produced by the atmosphere pressing on said container from the outside of said container.

11. The process of claim 2, wherein the interior of said container is maintained at a pressure below the external ambient pressure.

12. The process of claim 2, wherein said base composition is delivered to a first pump under pressure produced by the atmosphere pressing on said container from the outside of said container.

13. The process of claim 3, wherein the interior of said container is maintained at a pressure below the external ambient pressure.

14. The process of claim 3, wherein said base composition is delivered to a first pump under pressure produced by the atmosphere pressing on said container from the outside of said container.

15. The process of claim 4, wherein the interior of said container is maintained at a pressure below the external ambient pressure.

16. The process of claim 4, wherein said base composition is delivered to a first pump under pressure produced by the atmosphere pressing said container from the outside of said container.

17. The process of claim 5, wherein the interior of said container is maintained at a pressure below the external ambient pressure.

18. The process of claim 5, wherein said base composition is delivered to a first pump under pressure produced by the atmosphere pressing on said container from the outside of said container.

19. The process of claim 6, wherein the interior of said container is maintained at a pressure below the external ambient pressure.

20. The process of claim 6, wherein said base composition is delivered to a first pump under pressure produced by the atmosphere pressing on said container from the outside of said container.

* * * * *

UNITED STATES PATENT AND TRADEMARK OFFICE
CERTIFICATE OF CORRECTION

PATENT NO. : 6,911,495 B2
DATED : June 28, 2005
INVENTOR(S) : Thomas Hierstetter et al.

It is certified that error appears in the above-identified patent and that said Letters Patent is hereby corrected as shown below:

Column 11,
Lines 54 and 56, delete "die" and insert therefor -- the --.

Column 12,
Lines 1 and 8, delete "die" and insert therefor -- the --.
Line 13, delete "mm" and insert therefor -- min --.

Signed and Sealed this

Thirteenth Day of September, 2005

JON W. DUDAS
*Director of the United States Patent and Trademark Office*